United States Patent
Bedrosian

(10) Patent No.: US 9,124,380 B2
(45) Date of Patent: Sep. 1, 2015

(54) PACKET DELAY DISTRIBUTION RATE FILTERING

(71) Applicant: LSI Corporation, San Jose, CA (US)

(72) Inventor: P. Stephan Bedrosian, Andover, MA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 122 days.

(21) Appl. No.: 13/796,015

(22) Filed: Mar. 12, 2013

(65) Prior Publication Data

US 2014/0153591 A1    Jun. 5, 2014

Related U.S. Application Data

(60) Provisional application No. 61/732,541, filed on Dec. 3, 2012.

(51) Int. Cl.
| | |
|---|---|
| *H04J 3/16* | (2006.01) |
| *H04J 3/06* | (2006.01) |
| *H04L 12/24* | (2006.01) |
| *H04L 12/26* | (2006.01) |

(52) U.S. Cl.
CPC ............ *H04J 3/0658* (2013.01); *H04J 3/0661* (2013.01); *H04L 41/142* (2013.01); *H04L 43/0852* (2013.01); *H04L 43/0858* (2013.01); *H04L 43/0864* (2013.01)

(58) Field of Classification Search
CPC ........................................ H04L 12/56
USPC .......................... 370/350, 503, 517
See application file for complete search history.

(56) References Cited

U.S. PATENT DOCUMENTS

| | | | |
|---|---|---|---|
| 2007/0204285 A1* | 8/2007 | Louw .......................... 725/14 |
| 2007/0223537 A1* | 9/2007 | Crowle et al. ............. 370/503 |
| 2008/0219180 A1* | 9/2008 | Bedrosian ................. 370/252 |
| 2008/0310447 A1* | 12/2008 | Bedrosian ................. 370/468 |
| 2010/0309934 A1* | 12/2010 | Umayabashi et al. ..... 370/509 |
| 2011/0228834 A1* | 9/2011 | Umayabashi et al. ..... 375/224 |

* cited by examiner

*Primary Examiner* — Kevin C Harper
(74) *Attorney, Agent, or Firm* — Suiter Swantz pc llo

(57) ABSTRACT

To test the timing-recovery process of a receiving (i.e., slave) node in a packet-based network, a packet filter is configured in a test configuration that already contributes a natural delay distribution to the packet flow arriving at the slave node. The resulting delay distribution of the arriving packet flow is the combination of that natural delay distribution and the effects of the packet filter, which deterministically or statistically reduces the number of packets with delays within the anchor value window arriving at the slave node (i.e., received packets having packet delays within the slave node's anchor value window). The packet filter can be adjusted to test the slave node's timing-recovery process for a wide variety of packet-flow conditions (e.g., different rates of packets with delays within the anchor value window).

20 Claims, 9 Drawing Sheets

PACKET DELAY DISTRIBUTION RATE FILTERING

CROSS-REFERENCE TO RELATED APPLICATIONS

This application claims the benefit of the filing date of U.S. provisional application No. 61/732,541, filed on Dec. 3, 2012, the teachings of which are incorporated herein by reference in their entirety.

BACKGROUND

1. Field of the Invention

The present invention relates to timing recovery in packet-based electronic or optical networks.

2. Description of the Related Art

This section introduces aspects that may help facilitate a better understanding of the invention. Accordingly, the statements of this section are to be read in this light and are not to be understood as admissions about what is prior art or what is not prior art.

The need to develop and support reliable timing transport systems that rely on packet-based transport is growing. Packet-based transport networks that rely on the ability to transport high-quality traceable timing typically use timestamp-bearing methods such as IEEE1588 or NTP. There have even been systems implemented that use both a timestamp-bearing protocol, such as IEEE1588, and a physical-layer protocol, such as synchronous Ethernet, to improve the accuracy of the recovery process at the receiving node. Other adaptive packet-based timing systems rely on the arrival of packets as the protocol for transporting frequency-based timing over packet networks. Due to the adverse affect of packet delay variation (PDV) on these packet-based systems, equipment providers want to evaluate the susceptibility and degradation due to PDV on the timing recovery performance of these systems.

In Study Group 13 Question 15 of the International Telecommunication Union—Telecommunication Standardization Sector (ITU-T), an effort is underway to define PDV network limits for packet-based timing recovery systems. Fundamental to the work is the ability to relate existing or new metrics as a basis to define specific characteristics or changes in the packet delay distribution of packets that arrive at a receiving node. Second, a methodology is sought in order to create specific types of PDV stress conditions that represent real-world network conditions.

Many packet-based timing recovery systems rely on recovering timing from those packets that experience the least network delay over a given sample period. These low-delay packets are used to determine an "anchor value" that defines the delay-floor and is the basis for establishing and maintaining timing accuracy or phase stability at the receiving node. Still, other packet-based timing recovery systems define anchor values that can be located at other regions of the delay distribution and not necessarily at the minimum delay value over a given sample window. Still, other packet-based timing recovery systems define the anchor value over multiple sample windows that measure other statistical aspects of the delay distribution. It is therefore desired to create a network limit and associated metric that defines an appropriate stress condition that can be used to evaluate the stability of the packet-based timing recovery systems as a basis for a standardized network limit.

Packet-based timing systems can operate in two basic modes: one-way mode or two-way mode. In a one-way mode of operation, only a slave node receives a timing packet flow from a master node. Due to the inability of a slave node to know the exact propagation delay between the master node and the slave node, the resulting anchor value computed by the slave will reflect a negative time error equal to the propagation delay. In a two-way mode of operation, a slave node receives a timing packet flow from a master node and sends measurement packets to and receives measurement packets from the master node. The slave node then uses the timestamps of these measurement packets to (i) compute the one-way delay between the master node and the slave node and (ii) remove the negative time error from the computed anchor value.

To date, a number of ITU-T participants have created contributions that distort various aspects of the packet delay distribution used to determine the anchor value. For example, for timing recovery systems that compute anchor values at or near the delay-floor, various ways have been proposed to create stress conditions that modulate the packet delays of the delay-floor packets. Some vendors have proposed modulating the delays of delay-floor packets by a slowly varying sine wave with a fixed or varying amplitude and frequency. Others have proposed using a statistical means of doing the same. At this time, ITU-T is considering developing a PDV metric that addresses those packets within 150 microseconds of the delay-floor. Numerous contributions have been submitted to ITU-T that either deterministically or statistically modify the delays of packets in this range to create a stress condition at the timing recovery process at the receiving node.

The fundamental issue with the current proposals is the lack of agreement that these stress conditions represent real-world conditions. The key to defining a suitable stress condition stems from the statistical filtering process used at the receiving node to recover a packet-based clock signal. Due to the proprietary nature of these statistical filtering algorithms, a common standardized testing method has not yet been identified. Specifically, these packet-based clock recovery algorithms define methodology for stabilizing the phase of the recovered timing signal called an anchor value. Some algorithms define the anchor value relative to the delay-floor of the received distribution. Still other algorithms may define the anchor value based on specific statistical or filtering methods that exclude packet delays near the delay-floor. Therefore, a testing method that stresses only the delay-floor packets might not fully evaluate packet recovery algorithms based on this latter case. A number of PDV metrics have been devised that examine the delay variation characteristics of packets in various bands of the delay distribution including Minimum Time Deviation (MinTDEV), Percentile Time Deviation (PercentileTDEV), Band Time Deviation (BandTDEV), Cluster Time Deviation (ClusterTDEV), the Maximum Average Frequency Error (MAFE), Minimum MAFE (minMAFE), Maximum Average Time Interval Error (MATIE) and Minimum MATIE (minMATIE). Other metrics have also been developed to describe how the delay-floor anchor value can change under a variety of real-world network conditions including Floor Packet Count (FPC) and Floor Packet Percent (FPP). Therefore, a means of creating stress conditions at the receiving node for each type of anchor value clock stabilizing algorithm is desired.

BRIEF DESCRIPTION OF THE DRAWINGS

Other embodiments of the invention will become more fully apparent from the following detailed description, the appended claims, and the accompanying drawings in which like reference numerals identify similar or identical elements.

DETAILED DESCRIPTION

Figure 1:
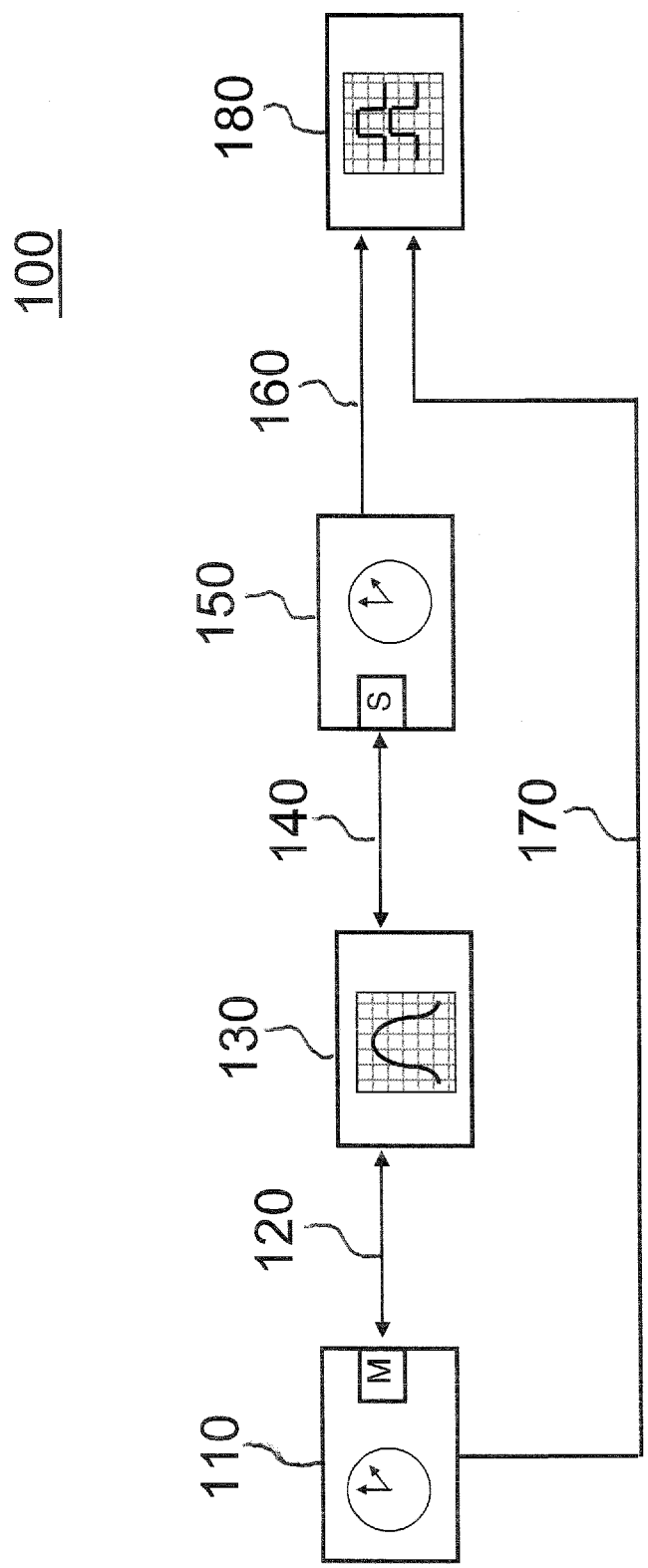
FIG. 1 shows a high-level block diagram of a test configuration for testing the clock-recovery process implemented by a slave node.

The present disclosure provides a methodology for creating a deterministic or statistical stress condition on packets with delays within the anchor value window used to recover timing at a receiving (i.e., slave) node of a packet-based network. In essence, the density or number of packets with delays within the anchor value window of a given packet delay distribution can be deterministically or statistically reduced to create a stress condition on the slave node's packet-based timing recovery process.

For example, some timing-recovery processes that use the delay-floor as the anchor value involve the application of a delay-floor window, which is defined as the range of packet-delay values from the slave node's current packet delay-floor to a specified delay threshold above the current packet delay-floor. Received packets whose packet-delay values are within the delay-floor window are delay-floor packets that used to update the recovered clock signal. Received packets whose packet-delay values are outside the specified delay-floor window are not delay-floor packets and are subsequently ignored by the timing-recovery process, that is, not used to update the recovered clock signal.

One way to cause a stress condition on a packet-based timing transport system is to reduce the number of delay-floor packets recovered at the slave node. Such a stress condition can be realized by filtering the packet flow by adding a sufficient amount of delay (e.g., a specified delay offset value greater than the size of the delay-floor window) to a selected number or percentage of the packets in the packet flow to ensure that the delay of those selected packets will be outside of the delay-floor window when those selected packets arrive at the slave node. The rest of the packets to which the specified delay offset value has not been added will retain the temporal and frequency delay variation characteristics of the unfiltered packet flow.

Packet-based timing recovery systems rely on (at least) the following factors related to packet delays within the anchor value window:

The stability of the packets within the anchor value window: The variation in delay of those packets at or near the anchor value as defined by the timing recovery algorithm of the slave clock. Also referred to herein as the PDV distribution or the delay distribution;

The rate of occurrence of packets within the anchor value window: How often packets occur within the anchor value window applied as part of the receiving node's (slave clock) timing-recovery process; and Delay shifts of packets within the anchor value window: Changes in the delay distribution of the received packets that significantly alter the population of packets within the anchor value window. For example, a delay-floor shift typically occurs when the routing path of packets through the network changes between two physically different topologies.

Therefore, any method used to reduce the number of packets that define the anchor value of a packet-based timing recovery system should be able to address each of these three factors.

The fundamental objective of packet-based timing-recovery systems is the ability to maintain a stable clock output phase regardless of changes in the propagation delay or delay distribution of a packet flow between a master node and a slave node. Packet-based timing systems operate in either the one-way mode of operation or the two-way mode of operation to achieve different levels of timing performance as required by the end application. In the one-way mode of operation, a slave node will base its timing recovery process on the arrival of timestamped packets received from a master node. In this mode of operation, the slave node will syntonize to the master node's clock but not fully synchronize since the one-way delay is unknown to the slave clock. In the two-way mode of operation, a slave node operates as described in the one-way mode but also sends measurement packets to the master node which are processed by the master node and sent back to the slave node (e.g., Delay_Request and Delay_Response mechanism). Therefore, the two-way mechanism supports the measurement of the symmetric one-way delay between a master node and a slave node and allows the timing recovery process to synchronize to the master node clock. For each of these modes of operation, the slave node's recovered clock phase stability is equally important to the end application.

Clock phase stability is typically defined in terms of an MTIE mask. Since most packet-based timing receivers update their output clock based on the availability of packets with delays within the anchor value window, the present disclosure provides a stress methodology that (deterministically or statistically) controls the availability of packets with delays within the anchor value window over a given time interval. In addition, since the variation of packets with delays within the anchor value window may need to comply with metrics that specify PDV network limits, such a stress methodology should preserve the temporal and frequency delay variation characteristics of the unfiltered packet flow.

FIG. 1 shows a high-level block diagram of a test configuration 100 for testing the clock-recovery process implemented by slave node 150, i.e., the device under test (DUT) in this test configuration. In addition to slave node 150, test configuration 100 includes master node 110, packet filter 130, and test equipment 180, which may include an oscilloscope. In one possible implementation, master node 110 and packet filter 130 are interconnected by a first Ethernet link 120, and packet filter 130 and slave node 150 are similarly interconnected by a second Ethernet link 140, while master node 110 and slave node 150 are respectively connected to test equipment 180 by some other (e.g., non-Ethernet) links 160 and 170 that support direct evaluation of the master and slave output clock signals.

The clock-recovery process implemented by slave node 150 uses the arrival times and/or embedded timestamps of packets transmitted by master node 110 to slave node 150 via Ethernet links 120 and 140 and filtered by packet filter 130, to establish a current packet anchor value that is itself used to generate and output a recovered clock signal on link 160. That clock-recovery process assigns a packet-delay value to each packet received at slave node 150. Received packets whose packet-delay values are within a specified anchor value window are used to update the recovered clock signal. Received packets whose packet-delay values are outside the specified anchor value window are subsequently ignored by the timing-recovery process, that is, not used to update the recovered clock signal.

In the one-way mode of operation, master node 110 generates and transmits a flow of packets with embedded timestamps at a rate of, for example, 1 packet per second (1 PPS) to packet filter 130 via Ethernet link 120. At the same time, master node 110 transmits its master clock signal, used to generate the embedded timestamps, to test equipment 180 via link 170. As described more fully below, packet filter 130 filters the packet flow received via Ethernet link 120 to reduce the number of packets that will fall within the anchor value window of slave node 150 when those packets arrive at slave node 150. The resulting filtered packet flow is transmitted from packet filter 130 to slave node 150 via Ethernet link 140. Slave node 150 receives the individual packets in the filtered packet flow and implements its timing-recovery process to generate and transmit the recovered clock signal to test equipment 180 via link 160. Test equipment 180 compares the recovered clock signal received via link 160 with the master clock signal received via link 170 and applies appropriate processing using applicable metrics, such as time interval error (TIE), maximum TIE (MTIE), or time deviation (TDEV), to assess the ability of slave node 150 to generate a suitable recovered clock signal.

In the two-way mode of operation, master node 110 generates and transmits a flow of packets with embedded timestamps at a rate of, for example, 1 packet per second (1 PPS) to packet filter 130 via Ethernet link 120. At the same time, master node 110 transmits its master clock signal, used to generate the embedded timestamps, to test equipment 180 via link 170. As described more fully below, packet filter 130 filters the packet flow received via Ethernet link 120 to reduce the number of packets that will fall within the anchor value window of slave node 150 when those packets arrive at slave node 150. The resulting filtered packet flow is transmitted from packet filter 130 to slave node 150 via Ethernet link 140.

Additionally, the slave node 150 generates and transmits a flow of packets for the purpose of measuring the one-way delay between the master node and the slave node at a rate of, for example, 1 packet every 4 seconds (0.25 PPS) to the packet filter 130 via Ethernet link 140. The packet filter 130 filters the packet flow received via Ethernet link 140 to (i) reduce the number of packets that fall within the anchor window of slave node 150 when the response to these measurement packets is processed by master node 110 and sent back to slave node 150 or (ii) otherwise stress the timing-recovery processing of slave node 150. The resulting packet flow is transmitted from packet filter 130 to master node 110 via Ethernet link 120. Master node 110 then processes the incoming measurement packet flow and sends a second, outgoing measurement packet flows to the packet filter 130 via Ethernet link 120 in response to the incoming measurement packets.

For example, the IEEE1588 protocol defines a Delay_Request and Delay_Response mechanism for this purpose. The slave node sends Delay_Request packets to the master node, and the master node returns a Delay Response packet for each received Delay_Request packet. The slave node then uses the transmit time of the Delay_Request packet and the arrival time of the Delay_Response packet to compute the one-way delay between the master and slave nodes. The packet filter 130 filters the measurement packet flow received via Ethernet link 120 to (i) reduce the number of packets that will fall within the anchor value window of slave node 150 when the measurement packet flow arrives at slave node 150 or (ii) otherwise stress the timing-recovery processing of slave node 150. The resulting filtered measurement packet flow is transmitted from packet filter 130 to slave node 150 via Ethernet link 140. Slave node 150 receives the individual packets in the filtered packet flows and implements its timing-recovery process to generate and transmit the recovered clock signal to test equipment 180 via link 160. Test equipment 180 compares the recovered clock signal received via link 160 with the master clock signal received via link 170 and applies appropriate processing using applicable metrics, such as time interval error (TIE), maximum TIE (MTIE), or time deviation (TDEV), to assess the ability of slave node 150 to generate a suitable recovered clock signal.

Because the master packet flow is transmitted over actual Ethernet links 120 and 140, with packet filter 130 disabled (i.e., allowing packets to flow without any additional delay), the packets in that packet flow will have a natural delay distribution like those in real-world networks. Depending on the characteristics of those actual Ethernet links, that natural delay distribution may have some packets that naturally arrive at slave node 150 outside of the anchor value window.

By controlling packet filter 130, test configuration 100 can be used to test the timing-recovery operations of slave node 150 for a wide variety of different packet-flow conditions (e.g., having different rates of packets with delays within the anchor value window). In one possible implementation of test configuration 100, packet filter 130 and test equipment 180 can be configured into a real-world Ethernet network comprising master node 110 and slave node 150. In this way, the stability of packets with delays within the anchor value window and the occurrence of anchor value shifts (e.g., delay-floor shifts) will be controlled by the real-world network, while the rate of occurrence of packets with delays within the anchor value window (i.e., packets that fall within the slave node's anchor value window) will be controlled by both (i) the real-world network and (ii) packet filter 130.

In certain implementations of test configuration 100 of FIG. 1, packet filter 130 performs a modulo-based filtering algorithm. According to the generic modulo-based filtering algorithm, packet filter 130 evaluates the delay of all packets in the packet flow received from master node 110 via Ethernet link 120, assigns a modulo-counter value to each packet whose delay falls within a specified delay window, and determines whether to adjust the delay of each counted packet by comparing the corresponding assigned modulo-counter value to a specified threshold value. Depending on the particular implementation, if the modulo-counter value is greater than (less than) the specified threshold value, then packet filter 130 delays the counted packet by at least a specified delay offset value before transmitting the counted packet towards slave node 150 via Ethernet link 140, where the specified delay offset value is sufficiently large to ensure that the counted packet will be outside of the slave node's anchor value window when it arrives at slave node 150. If the modulo-counter value is not greater than (not less than) the specified threshold value, then packet filter 130 transmits the counted packet towards slave node 150 via Ethernet link 140 without adding the specified delay offset value. Note that the specified delay offset value could be any value larger than the size of the slave node's anchor value window.

For example, if (i) the modulo-counter values are generated using a divisor value of 100 and (ii) the specified threshold value is 50, then packet filter 130 will ensure that (at least) 50% of the counted packets will fall outside of the slave node's anchor value window. In that way, the timing-recovery process of slave node 150 can be tested with a packet flow having (no more than) half the number of delay-floor packets than the number of packets with delays within the anchor value window in the unfiltered packet flow. The specified threshold value can be selectively increased or decreased to test slave node 150 for a variety of different anchor value packet rates. Note that, in general, any percentage P of packets can be achieved by selecting a divisor value D and a threshold value T such that P=T/D.

Note that, in implementations that count only those received packets that are within the slave node's anchor value window, packet filter 130 receives the current value of the anchor value from slave node 150. In other implementations, packet filter 130 counts all of the received packets without determining whether they are inside or outside of the slave node's anchor value window. In those implementations, packet filter 130 does not need to receive the current value of the anchor value from slave node 150.

Figure 2:
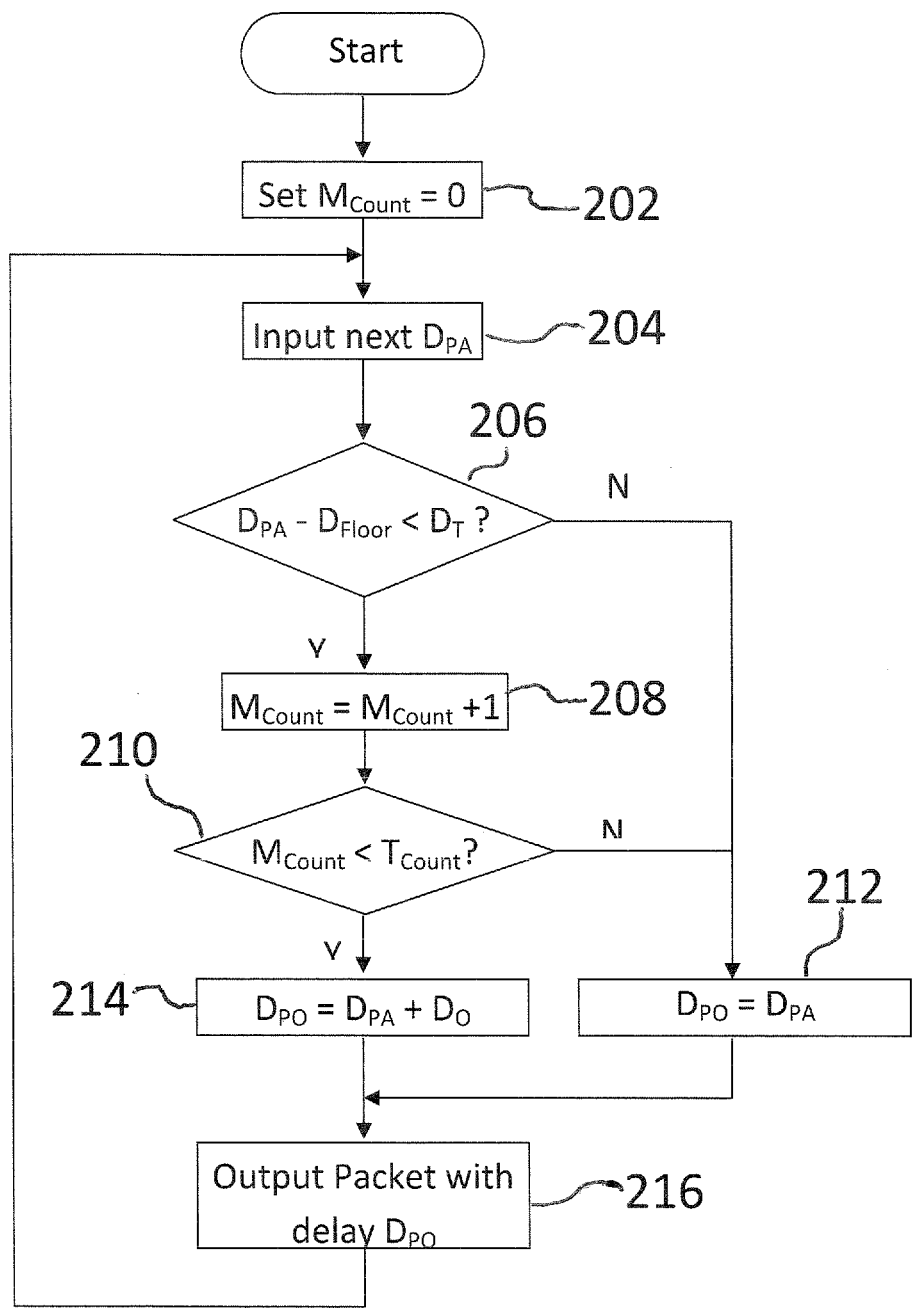
FIG. 2 shows a flow diagram of the processing of the packet filter of FIG. 1 for an implementation that counts only those received packets that are within the slave node's delay-floor window.

FIG. 2 shows a flow diagram of the processing of packet filter 130 of FIG. 1 for an implementation that counts only those received packets that are within the slave node's delay-floor window. In step 202, the modulo counter is reset such that the current modulo-counter value $M_{Count}=0$. In step 204, the next packet is received at packet filter 130 having an incoming packet-delay value of $D_{PA}$. In step 206, it is determined whether the received packet is within the slave node's delay-floor window. In particular, if the received packet's incoming packet-delay value $D_{PA}$ is less than the delay-floor window size $D_T$ above the slave node's current packet delay-floor $D_{Floor}$, then the received packet is within the slave node's delay-floor window and processing continues to step 208. Otherwise, the received packet is outside the slave node's delay-floor window and processing proceeds to step 212.

In step 208, the received packet is counted by incrementing the modulo-counter value $M_{Count}$. Note that, since $M_{Count}$ is generated by a modulo counter, if the incremented value is equal to the specified modulo divisor value (e.g., 100 in the previous example), then $M_{Count}$ is reset to zero in step 208. In step 210, it is determined whether $M_{Count}$ is below the specified threshold value $T_{Count}$ (e.g., 50 in the previous example). If so, then processing proceeds to step 212. Otherwise, processing proceeds to step 214.

If processing reaches step 212, then the specified delay offset value should not be added to the received packet. In that case, the outgoing packet delay $D_{PO}$ is set equal to the received packet's incoming packet delay $D_{PA}$. If processing reaches step 214, then the specified delay offset value should be added to the received packet. In that case, the outgoing packet delay $D_{PO}$ is set equal to the received packet's incoming packet delay $D_{PA}$ plus the specified delay offset value $D_O$.

In either case, processing then proceeds to step 216, where the received packet is output with the corresponding outgoing packet delay $D_{PO}$. Processing then returns to wait for the next received packet to arrive at packet filter 130 at step 204.

Note that, for an implementation of packet filtering that counts every received packet, step 206 would be omitted.

Figure 3:
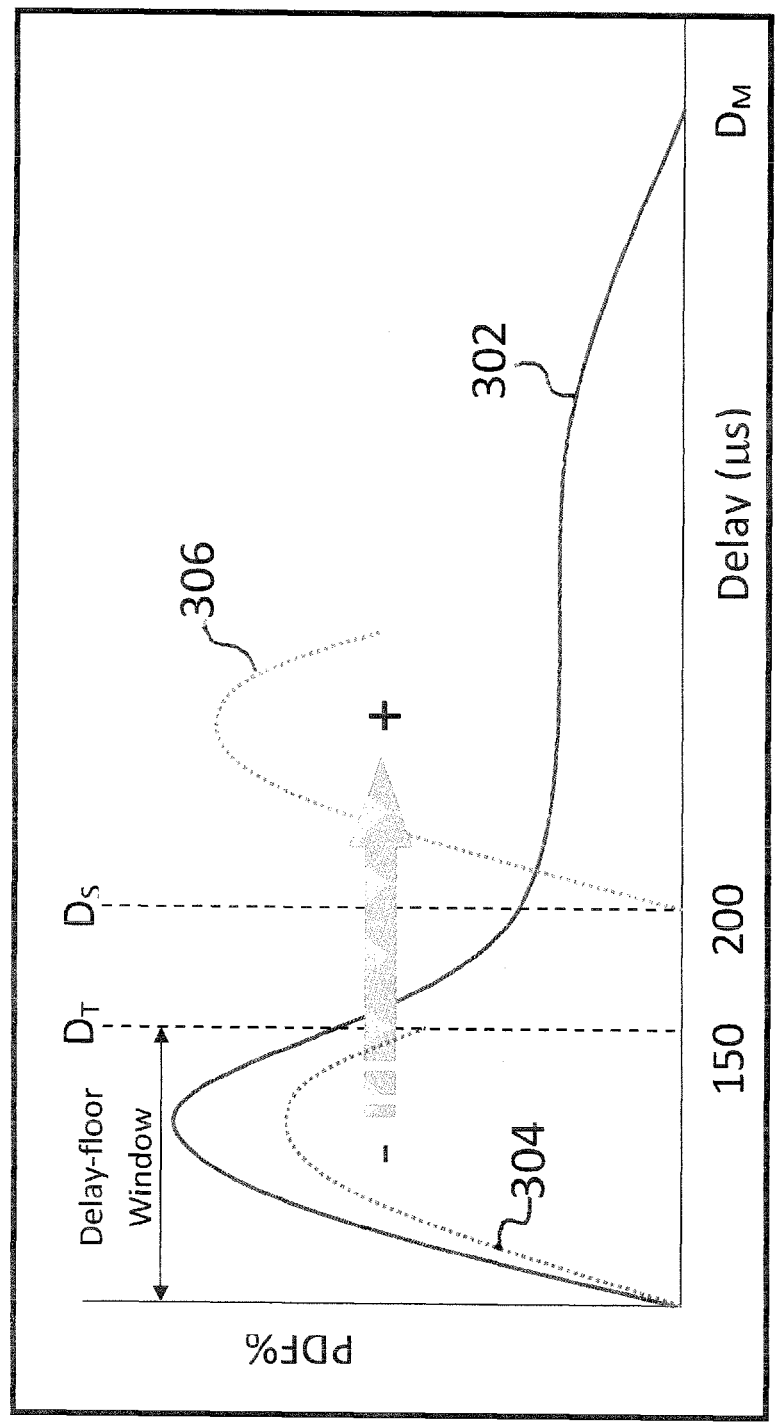
FIG. 3 shows graphical representations of the delay distribution of a packet flow arriving at the slave node of FIG. 1 with and without the packet filtering of the packet filter of FIG. 1.

FIG. 3 shows graphical representations of the delay distribution of a packet flow arriving at slave node 150 of FIG. 1 with and without the packet filtering of packet filter 130. In FIG. 3, curve 302 represents the natural delay distribution of the unfiltered packet flow. As shown in FIG. 3, in the natural delay distribution of curve 302, many of the packets in the unfiltered packet flow are delay-floor packets arriving within the delay-floor window defined between the current delay-floor $D_{Floor}$ and a specified delay-floor threshold $D_T$ (150 microseconds in this example) above the current delay-floor. The rest of the packets in the unfiltered packet flow are not delay-floor packets that arrive outside the delay-floor window.

Curves 304 and 306 represent the effects of exemplary packet filtering. In this example, packet filter 130 shifts more than half of the delay-floor packets in the packet flow outside of the delay-floor window by adding the specified delay offset value $D_O$ (200 microseconds in this example). In particular, curve 306 represents those delay-floor packets that are shifted outside of the delay-floor window by packet filter 130, while curve 304 represents the remaining, unshifted delay-floor packets. Note that, within the delay-floor window, the unfiltered packets of curve 304 retain the same temporal and frequency delay variation characteristics of the unfiltered packet flow of curve 302.

Note that the magnitudes of curves 302, 304, and 306 of FIG. 3 are not quantitatively accurate and are intended only to demonstrate qualitatively the effects of the packet filtering of packet filter 130.

One other aspect to consider is selecting the delay offset value $D_O$ relative to the defined delay-floor region ($D_T$) and the maximum value of the un-filtered PDV distribution ($D_M$). It may be desirable to select a delay offset value $D_O$ such that the shifted distribution of curve 306 does not exceed the value of $D_M$. This way the packet range of the filtered distribution will be identical to that of the original distribution. Generally, packet-based timing protocols rely on the periodic and sequential delivery of timestamp-bearing packets to a receiver. If the delay of a given timing packet is increased too much, it may result in out-of-sequence delivery of that packet at the receiver, thus altering the initial scope of the evaluation, i.e., evaluating clock performance with a stressed delay-floor. Therefore, the delay offset value $D_O$ should be such that the delay range of a given distribution is preserved.

Lastly, in order to allow an option to "shape" the filtered delay distribution, the delay offset value $D_O$ can be modulated over a range of delay values. These values can be selected either randomly or deterministically using a periodic function (sine, triangle wave, etc.). In keeping with the consideration in the previous paragraph, the range of delay offset values $D_O$ should be such that the maximum delay of the original distribution is not exceeded by the filtered delay distribution.

Figure 4:
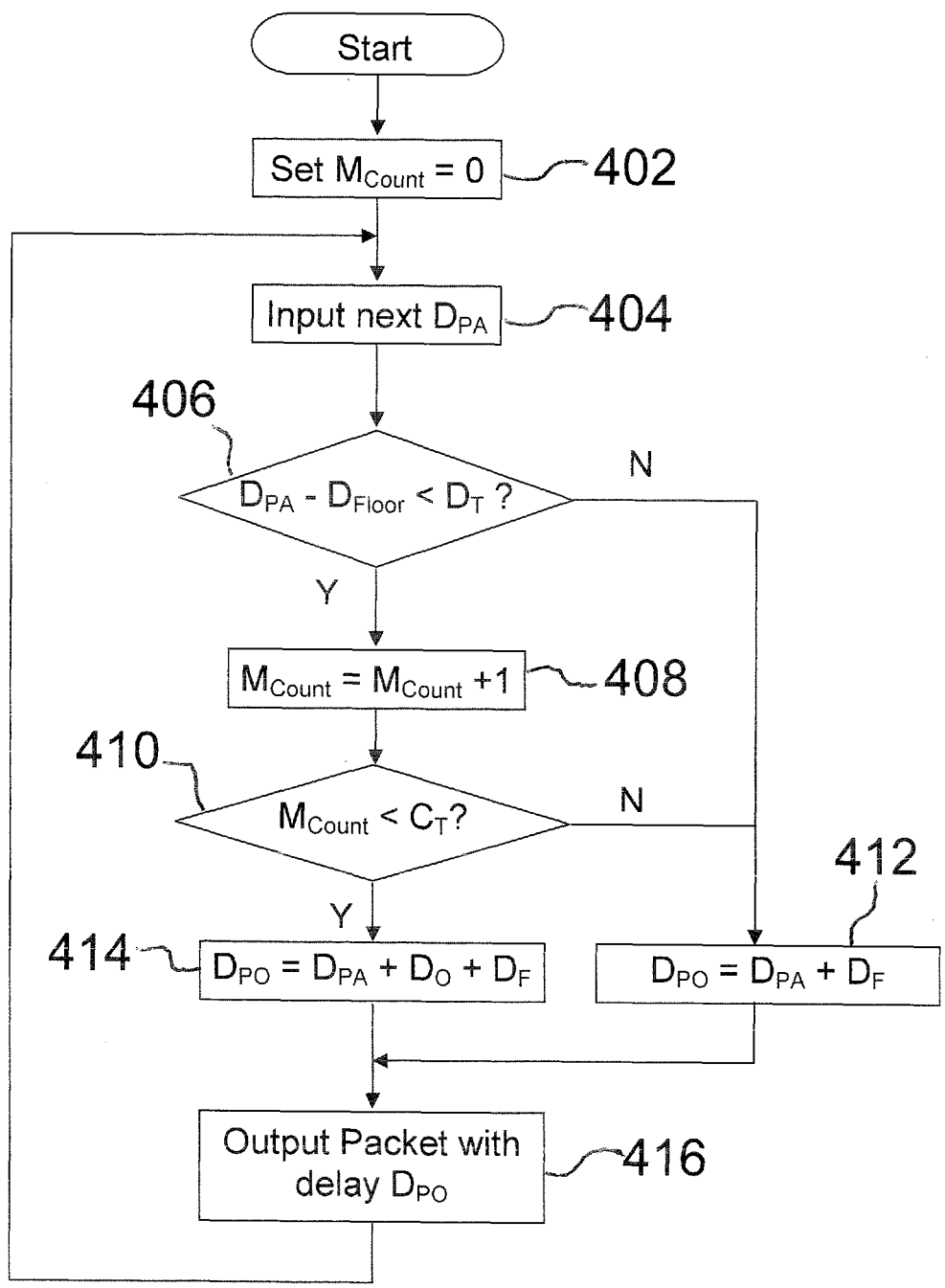
FIG. 4 shows a flow diagram of the processing of the packet filter of FIG. 1 for another implementation that counts only those received packets that are within the slave node's delay-floor window, but adds a fixed amount of delay $D_F$ to every received packet to account for packet processing delay by the packet filter.

FIG. 4 shows a flow diagram of the processing of packet filter 130 of FIG. 1 for another implementation that counts only those received packets that are within the slave node's delay-floor window, but adds a fixed amount of delay $D_F$ to every received packet to account for packet processing delay by packet filter 130. In FIG. 4, steps 402-416 are identical to steps 202-216 of FIG. 2 with the exception of steps 412 and 414, which include the fixed amount of delay $D_F$ being added to each received packet, whether it is counted or not.

In the implementations of FIGS. 1 and 2, packet filter 130 of FIG. 1 performs a modulo-based filtering algorithm. In certain other implementations of test configuration 100 of FIG. 1, packet filter 130 performs a random number-based filtering algorithm. According to the generic random number-based filtering algorithm, packet filter 130 assigns a random value within a specified available range of values to packets in the packet flow received from master node 110 via Ethernet link 120 and determines whether to adjust the delay of each packet by comparing the corresponding assigned random value to a specified threshold value. Depending on the particular implementation, if the assigned random value is greater than (less than) the specified threshold value, then packet filter 130 delays the packet by at least a specified delay offset value before transmitting the packet towards slave node 150 via Ethernet link 140, where, as before, the specified delay offset value is sufficiently large to ensure that the counted packet will be outside of the slave node's delay-floor window when it arrives at slave node 150. If the assigned random value is not greater than (not less than) the specified threshold value, then packet filter 130 transmits the counted packet towards slave node 150 via Ethernet link 140 without adding the specified delay offset value. Note that, as before, the specified delay offset value could be any value larger than the size of the slave node's delay-floor window.

For example, if (i) the available range of random values is 0-1 and (ii) the specified threshold value is 0.5, then packet filter 130 will ensure that (at least) 50% of the packets will fall outside of the slave node's delay-floor window. In that way, the timing-recovery process of slave node 150 can be tested with a packet flow having (no more than) half the number of delay-floor packets than the number of delay-floor packets in the unfiltered packet flow. The specified threshold value can be selectively increased or decreased to test slave node 150 for a variety of different delay-floor packet rates.

As before, in some implementations, packet filter 130 assigns random values to only a subset of the received packets, for example, only those packets received at packet filter 130 that have a packet delay that is within the slave node's delay-floor window. In those implementations, if a packet arrives at the packet filter with a packet delay that is already outside of the slave node's delay-floor window, then that packet is not assigned a random value by the packet filter and therefore not delayed by the specified delay offset value. In other implementations, packet filter 130 assigns random values to all of the received packets without determining whether they are inside or outside of the slave node's delay-floor window.

Figure 5:
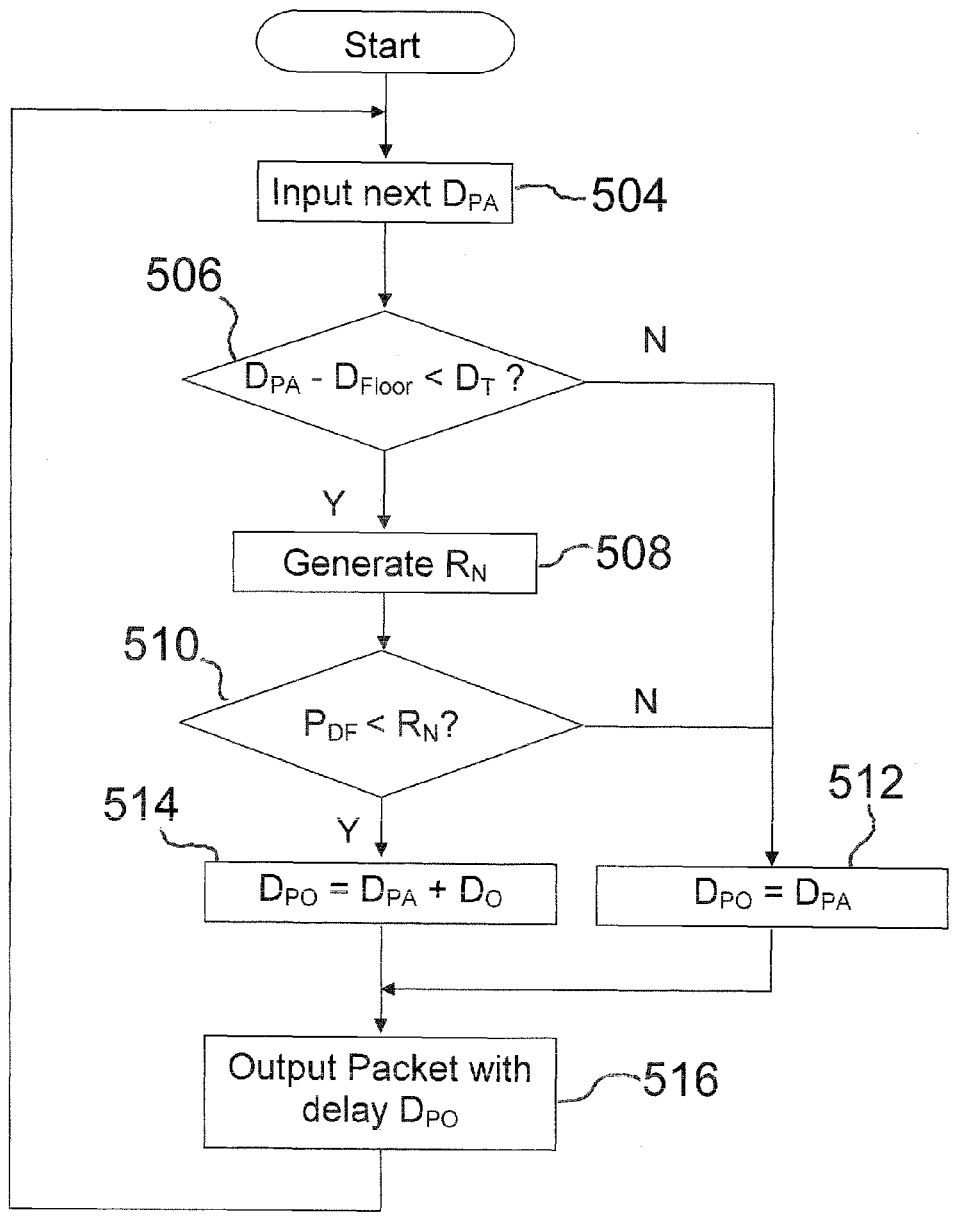
FIG. 5 shows a flow diagram of the processing of the packet filter of FIG. 1 for an implementation that assigns random values to only those received packets that are within the slave node's delay-floor window.

FIG. 5 shows a flow diagram of the processing of packet filter 130 of FIG. 1 for an implementation that assigns random values to only those received packets that are within the slave node's delay-floor window. Steps 504, 506, 512, 514, and 516 are identical to steps 204, 206, 212, 214, and 216, respectively, of FIG. 2. Instead of incrementing a modulo counter as in step 208 of FIG. 2, in step 508, packet filter 130 assigns a random value $R_N$ to the received packet. In step 510, packet filter 130 compares the assigned random value $R_N$ to the specified threshold value $P_{DF}$ to determine whether or not the specified delay offset value $D_O$ should be added to the packet delay.

Note that, as before, for an implementation of packet filtering that assigns random values to every received packet, step 506 would be omitted.

Figure 6:
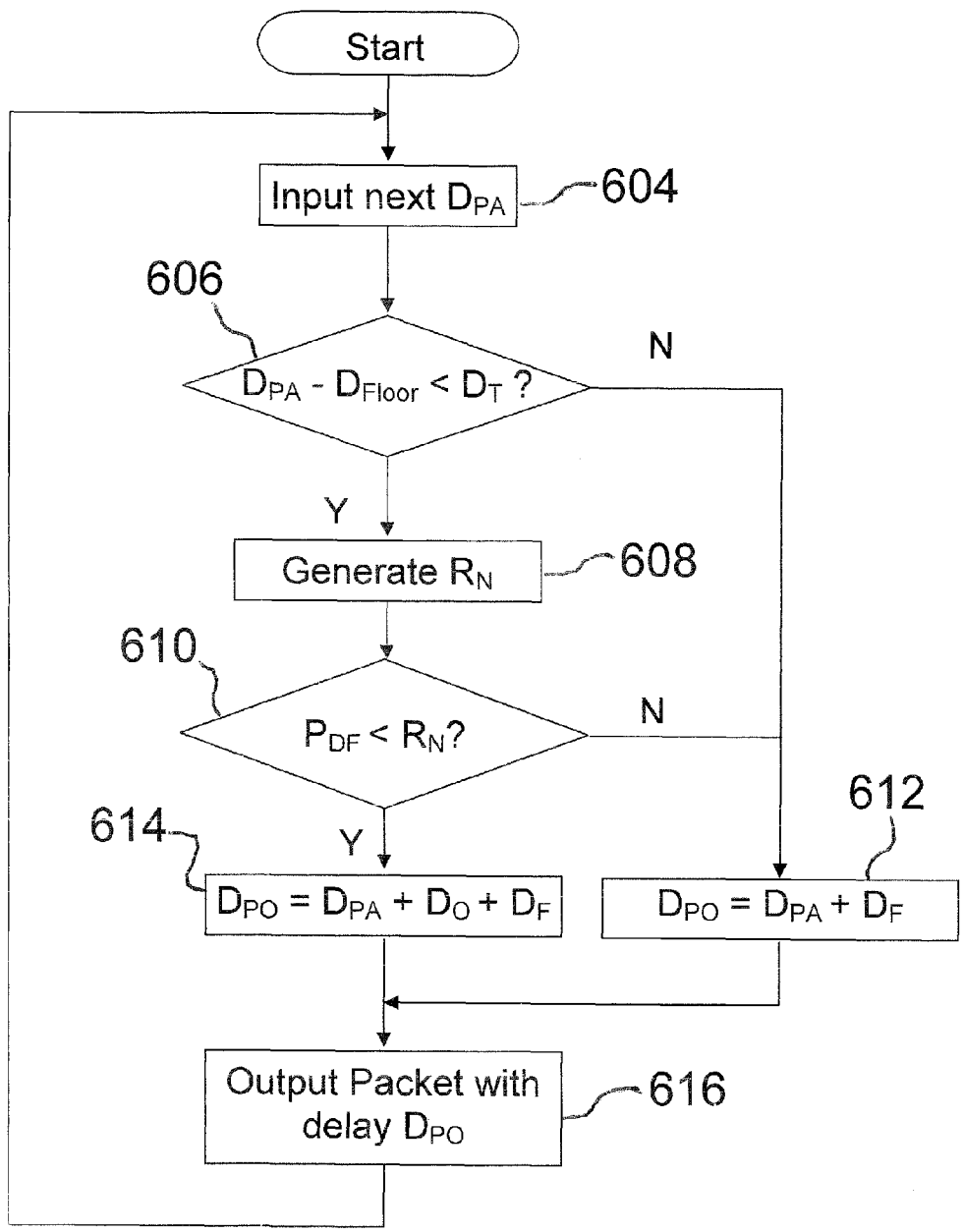
FIG. 6 shows a flow diagram of the processing of the packet filter of FIG. 1 for another implementation that assigns random values to only those received packets that are within the slave node's delay-floor window, but adds a fixed amount of delay $D_F$ to every received packet to account for packet processing delay by the packet filter.

FIG. 6 shows a flow diagram of the processing of packet filter 130 of FIG. 1 for another implementation that assigns random values to only those received packets that are within the slave node's delay-floor window, but adds a fixed amount of delay $D_F$ to every received packet to account for packet processing delay by packet filter 130. In FIG. 6, steps 604-616 are identical to steps 504-516 of FIG. 5. with the exception of steps 612 and 614, which include the fixed amount of delay $D_F$ being added to each received packet, whether or not a random value is assigned.

The modulo-based filtering algorithms of FIGS. 1 and 2 provide deterministic control over the rate at which delay-floor packets arrive at slave node 150, while the random number-based filtering algorithms of FIGS. 5 and 6 provide statistical control over the rate at which delay-floor packets arrive at slave node 150. The modulo scheme guarantees that X of Y packets with delays that fall within the anchor value window will be further delayed. The random number scheme guarantees that (on the average) X of Y packets with delays that fall within the anchor value delay window will be further delayed. The modulo scheme may be useful for stressing the maximum interval between packets with delays within the anchor value window that a slave clock can tolerate. The random number scheme may be useful for stressing the ability of a slave clock's PDV filtering algorithm to find the anchor value.

Other techniques for filtering the packet flow to control the rate of delay-floor packets arriving at slave node 150 are also possible. For example, the random number scheme could generate a random number per a uniform distribution or some other statistical distribution (Gaussian, Gamma, etc.) The modulo scheme could vary the modulo-N count during the test. For example, for each modulo count cycle, change the N count interval to maintain the "approximate" ratio. For example, if the goal is to filter out 50% of the packets with delays within the anchor value window, the Tcount threshold can be adjusted based on changes to the modulo-N counter. So, if N=10, then Tcount will be 5. If N=50, then Tcount will be 25. If N=51, then Tcount will be 26. This may be a way to randomize the filtering interval for the modulo case.

In test configuration 100 of FIG. 1, packet filter 130 is configured between master node 110 and slave node 150 by both an upstream Ethernet link 120 and a downstream Ethernet link 140, both of which links contribute to what would be, in the absence of filtering by packet filter 130, the natural delay distribution of the packet flow as it arrives at slave node 150. In the presence of filtering by packet filter 130, the delay distribution of the packet flow that arrives at slave node 150 is a combination of that natural delay distribution and the filtering applied by packet filter 130, which adds at least the specified delay offset value to a fraction of the packets in that packet flow. That combination of effects to the delay distribution of the packet flow can be applied in different orders.

For example, in test configuration 100 of FIG. 1, a first portion of the natural delay distribution is initially contributed by upstream Ethernet link 120, then the packet flow is filtered by packet filter 130, and then a second portion of the natural delay distribution is subsequently contributed by downstream Ethernet link 140. In an alternative test configuration, upstream Ethernet link 120 can be omitted, such that (i) packet filter 130 is connected immediately downstream of master node 110 and (ii) the delay distribution of the packet flow arriving at slave node 150 will result from only the filtering by packet filter 130, followed by the natural delay distribution contributed by downstream Ethernet link 140. Analogously, in another alternative test configuration, downstream Ethernet link 140 can be omitted, such that (i) packet filter 130 is connected immediately upstream of slave node 150 and (ii) the delay distribution of the packet flow arriving at slave node 150 will result from only the natural delay distribution contributed by upstream Ethernet link 120, followed by the filtering by packet filter 130.

Alternatively, in these different test configurations, one or each of Ethernet links 120 and 140 can be replaced by a network cloud or other real-world apparatus that similarly contributes to the natural delay distribution of the packet flow.

Figure 7:
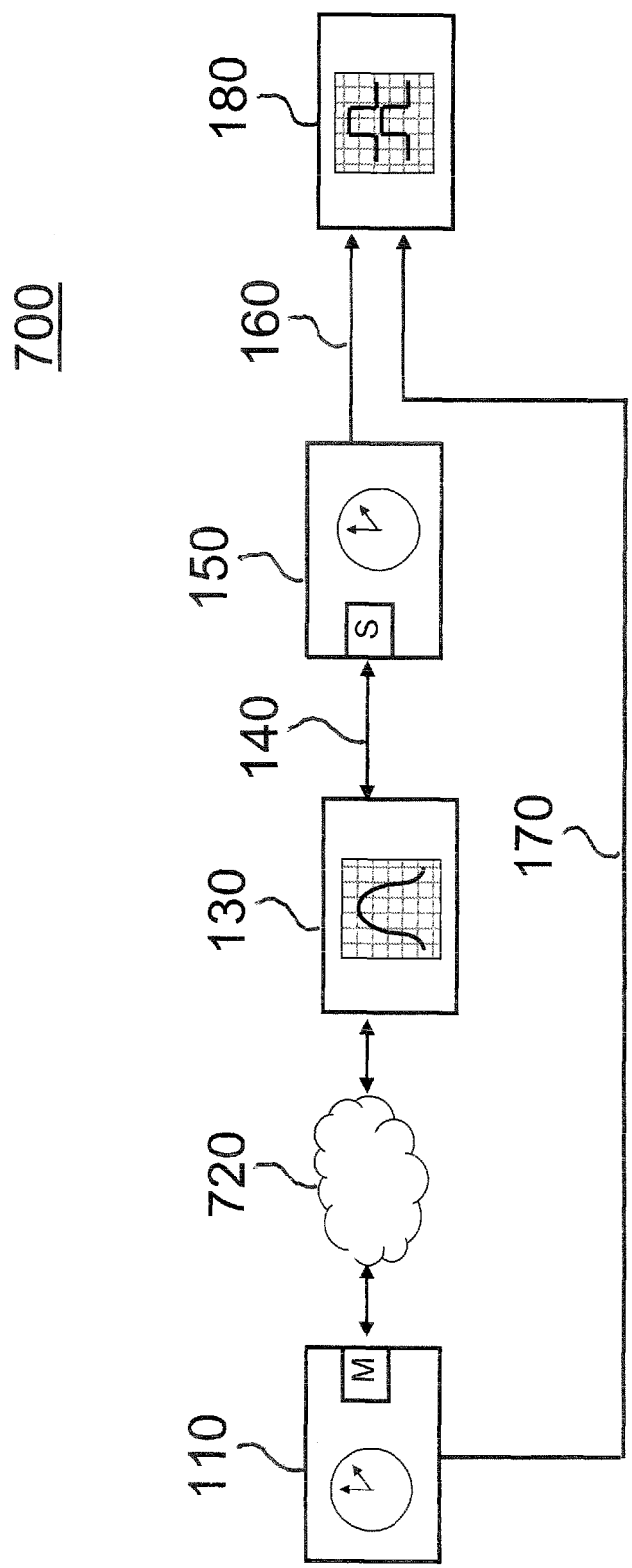
FIG. 7 shows a block diagram of an exemplary test configuration in which the upstream Ethernet link of FIG. 1 is replaced by a network cloud.

FIG. 7 shows a block diagram of an exemplary test configuration 700 in which upstream Ethernet link 120 is replaced by a network cloud 720. Otherwise, the elements of test configuration 700 are identical to those of test configuration 100. In test configuration 700, the delay distribution of the packet flow arriving at slave node 150 results from a first portion of the natural delay distribution initially contributed by network cloud 720, followed by the packet filtering of packet filter 130, followed by a second portion of the natural delay distribution subsequently contributed by Ethernet link 140.

For this case, network cloud 720 is composed of, for example, a plurality of packet switching or routing devices interconnected by Ethernet or other packet-based links. In addition, background packet traffic, not necessarily associated with network timing applications, can be present in the network cloud and compete for transport resources with packet traffic transmitted by master node 110. The resulting packet delay variation as seen at the input to packet filter 130 for packets sent by master node 100 and transported in network cloud 720 is referred to as the natural delay distribution.

Instead of or in addition to using Ethernet links and/or network clouds to contribute a natural delay distribution to the packet flow received at slave node 150, in alternative embodiments, an appropriate network emulator can be used to contribute a simulated portion to the natural delay distribution.

Figure 8:
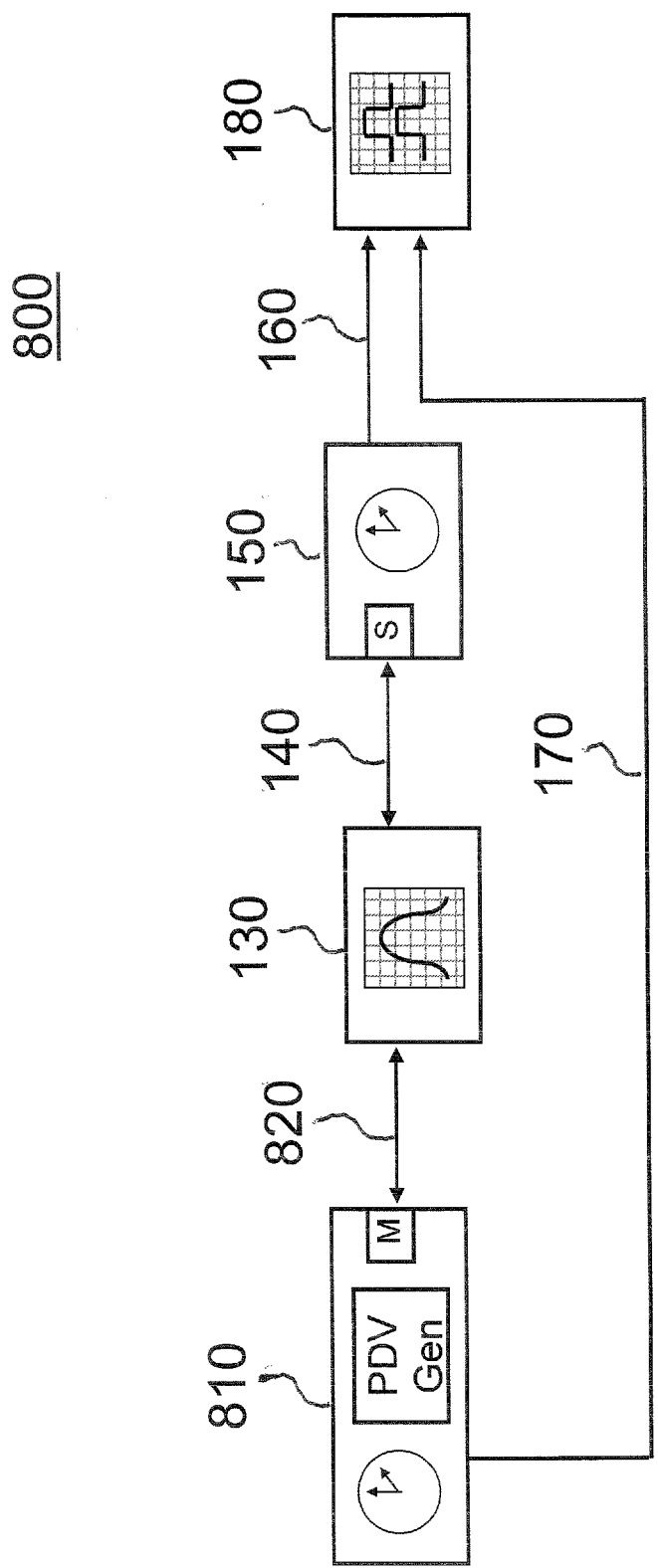
FIG. 8 shows a block diagram of an exemplary test configuration in which (i) the master node of FIG. 1 has been replaced by a network emulator and (ii) the upstream Ethernet link of FIG. 1 has been replaced by a non-Ethernet link.

FIG. 8 shows a block diagram of an exemplary test configuration 800 in which (i) master node 110 of FIG. 1 has been replaced by network emulator 810 and (ii) upstream Ethernet link 120 has been replaced by Ethernet link 820. Note that test configuration 800 can be implemented by configuring packet filter 130 into an existing test configuration having a conventional network emulator 810. In test configuration 800, the delay distribution of the packet flow arriving at slave node 150 results from a first, simulated portion of the natural delay distribution initially contributed by network emulator 810, followed by the packet filtering of packet filter 130, followed by a second, natural portion of the natural delay distribution subsequently contributed by Ethernet link 140.

Figure 9:
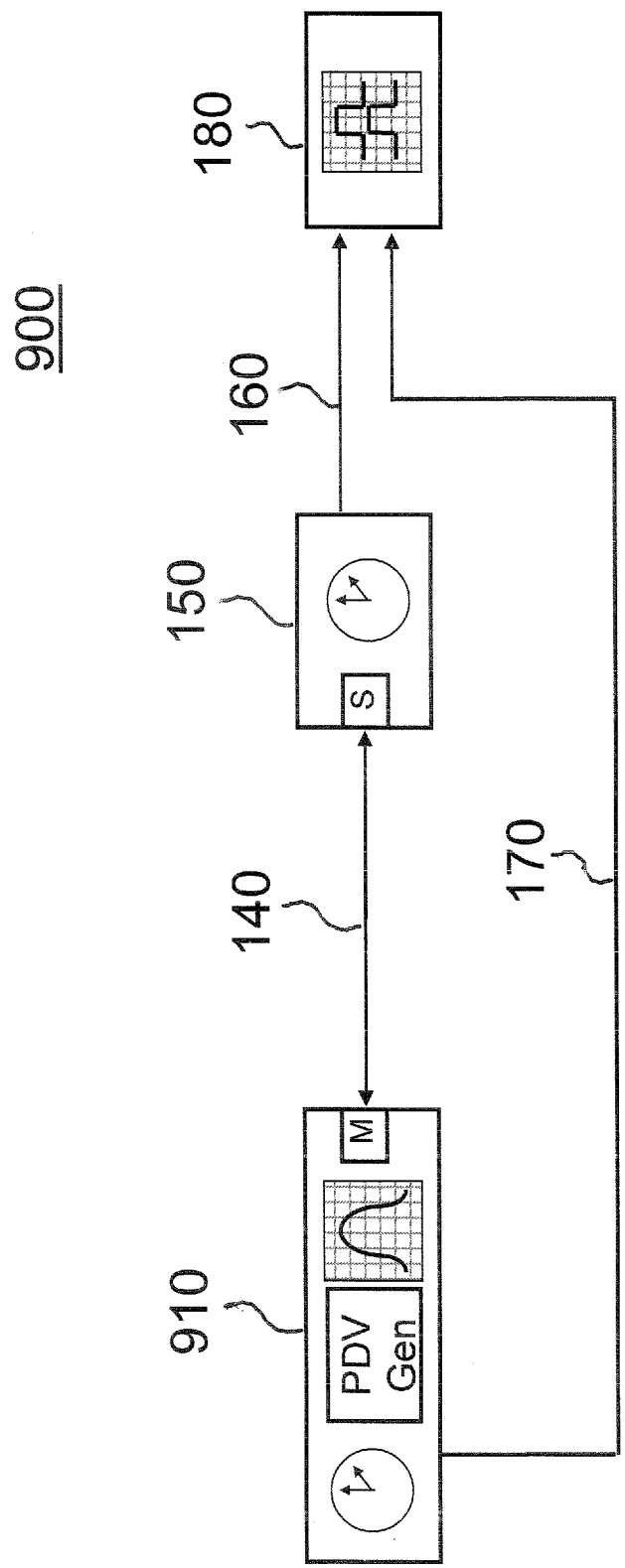
FIG. 9 shows a block diagram of another exemplary test configuration in which the master node, the upstream Ethernet link, and the packet filter of FIG. 1 have been replaced by a network emulator having a built-in packet filter.

FIG. 9 shows a block diagram of another exemplary test configuration 900 in which master node 110, upstream Ethernet link 120, and packet filter 130 of FIG. 1 have been replaced by network emulator 910 having a built-in packet filter that performs packet filtering analogous to that provided by packet filter 130. In test configuration 900, the delay distribution of the packet flow arriving at slave node 150 results from a first, simulated portion of the natural delay distribution initially contributed by network emulator 910, followed by the packet filtering of network emulator 910, followed by a second, natural portion of the natural delay distribution subsequently contributed by Ethernet link 140.

In test configuration 900, the packet filter is downstream of the PDV generator in network emulator 910. In alternative embodiments, the packet filter could be upstream of the PDV generator in a network emulator.

The basic application for this packet filter concept is to cause stress conditions on packet flows used for timing recovery. Since each slave clock vendor may use a different timing recovery algorithm, the timing performance of all slave clocks cannot be directly assessed by using a single "standardized" set of stress patterns. For example, some timing recovery algorithms may base their phase "anchor value" on the stability of the delay floor. Still others may use a combination of statistical measurements that don't involve the delay floor. The packet filter concept applies an appropriate stress condition to the slave clock under test.

The packet filter concept is capable of taking an existing input PDV distribution and altering it to achieve an appropriate stress condition. This technique of altering the PDV distribution of a packet flow used for timing can be used to evaluate the performance margin of a slave node for specific network scenarios. For example, if it is known that a slave clock recovery process uses only those packets with delays within 10 us of the delay floor, then the "density" of the lowest 10 us of the PDV distribution can be reduced deterministically using the packet filter, and the resulting timing recovery performance can be measured for each level of reduction.

Typically, slave clocks only recover timing information from those packets with favorable delay characteristics for a given packet flow. For all other times, the slave clock will set its timing recovery process to a "short-term holdover" mode of operation. During this time, frequency and phase of the slave clock's local oscillator is not updated. Rather, the stability of the slave clock's local oscillator determines the stability of the slave clock's output clock signal. During this time, the slave clock's local oscillator stability is subject to a variety of environmental factors that can influence its stability (including temperature, voltage, and vibration). The longer the interval between receiving packets with favorable delay characteristics, the more likely the chance that the slave clock's performance will be degraded.

The packet filter concept uses two methods to reduce the density of a targeted population of packet delays. The modulo filtering method ensures that a deterministic number of packets with delays in a defined range will be filtered. This method will generally create a periodic pattern of intervals of packets with favorable delay characteristics. Therefore, the modulo method can be used to control the length of short-term holdover mode in a repeatable pattern, thus evaluating the noise caused by the local oscillator under stress conditions.

The random filtering method ensures that a "target average" number of packets with delays in the anchor value window will be filtered out. Statistical in nature, this filtering approach will yield a different type of stress for the slave clock recovery process. With fewer favorable packets to derive the anchor value, slave clocks will be more susceptible to noise based on the statistical windowing process vs. noise caused by the local oscillator. In short, both the modulo and random filtering methods stress different operating and performance aspects of a slave clock and should both be considered.

Although test configurations have been described in the context of Ethernet links, those skilled in the art will understand that the present invention can be implemented using other types of packet-based communication links, including wireless links, which contribute to the natural delay distribution in the packet flow.

Embodiments of the invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, general-purpose computer, or other processor.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding links, nodes, or ports may be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Digital information can be transmitted over virtually any channel. Transmission applications or media include, but are not limited to, coaxial cable, twisted pair conductors, optical fiber, radio frequency channels, wired or wireless local area networks, digital subscriber line technologies, wireless cellular, Ethernet over any medium such as copper or optical fiber, cable channels such as cable television, and Earth-satellite communications.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain embodiments of this invention may be made by those skilled in the art without departing from embodiments of the invention encompassed by the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A timing recovery method, comprising:
   (a) determining, for a packet in a forward packet flow in a packet-based network, whether or not to shift the packet outside of an anchor value window of a timing-recovery process;
   (b) adding a specified non-zero delay offset value to an incoming packet delay value for the packet to generate an outgoing packet delay value for the packet when determination is made to shift the packet outside of the anchor value window, wherein the specified non-zero delay offset value is sufficiently large to ensure the outgoing packet delay value for the packet will be outside of the anchor value window when the packet arrives at a slave node of the packet-based network, and wherein the slave node is configured to perform the timing-recovery process; and
   (c) transmitting the packet towards the slave node with the outgoing packet delay value.

2. The method of claim 1, further comprising:
   (d) receiving a reverse measurement packet from the slave node;
   (e) determining whether or not to add an additional delay to the reverse measurement packet;
   (f) adding the additional delay to the reverse measurement packet when determination is made to add the additional delay to the reverse measurement packet;
   (g) transmitting the reverse measurement packet to a master node of the packet-based network;
   (h) receiving a forward measurement packet from the master node in response to the slave node; and
   (i) transmitting the forward measurement packet to the slave node.

3. The method of claim 1, wherein the specified non-zero delay offset value is not added to the incoming packet delay value for the packet in generating the outgoing packet delay value when determination is made not to shift the packet outside of the anchor value window.

4. The method of claim 1, further comprising: adding a fixed delay to the incoming packet delay value for the packet to account for processing delay in generating the outgoing packet delay value independent of the determination of step (a).

5. The method of claim 1, wherein step (a) further comprises:
   (a1) receiving the packet from a master node in the packet-based network;
   (a2) determining the incoming packet delay value for the packet; and
   (a3) determining whether or not the packet is inside the anchor value window, wherein said determining whether or not to shift the packet outside the anchor value window is performed after determination that the packet is inside the anchor value window.

6. The method of claim 1, wherein step (a) further comprises:
   (a1) receiving the packet from a master node in the packet-based network; and
   (a2) determining the incoming packet delay value for the packet, wherein said determining whether or not to shift the packet outside the anchor value window is performed independent of any determination of whether or not the packet is inside the anchor value window.

7. The method of claim 1, wherein the method is performed by a packet filter, and wherein the packet filter is a part of a network emulator that generates the forward packet flow.

8. The method of claim 1, wherein the packet-based network comprises at least one of:
   an upstream link connecting the packet filter to a master node of the packet-based network; and
   a downstream link connecting the packet filter to the slave node, wherein at least one of the upstream link and the downstream link contributes at least a portion of a natural delay distribution to the forward packet flow.

9. The method of claim 1, wherein step (a) comprises:
   (a1) assigning a modulo count value to the packet;
   (a2) comparing the assigned modulo count value to a specified threshold value; and
   (a3) determining whether or not to shift the packet outside of the anchor value window based on the comparison of step (a2).

10. The method of claim 1, wherein step (a) comprises:
    (a1) assigning a random value to the packet;
    (a2) comparing the assigned random value to a specified threshold value; and
    (a3) determining whether or not to shift the packet outside of the anchor value window based on the comparison of step (a2).

11. A packet filter communicatively couplable to a master node and a slave node in a packet-based network, the packet filter comprising:
    a processor configured to:
    (a) determine, for a packet in a forward packet flow in the packet-based network, whether or not to shift the packet outside of an anchor value window of a timing-recovery process;
    (b) add a specified non-zero delay offset value to an incoming packet delay value for the packet to generate an outgoing packet delay value for the packet when determination is made to shift the packet outside of the anchor value window, wherein the specified non-zero delay offset value is sufficiently large to ensure the outgoing packet delay value for the packet will be outside of the anchor value window when the packet arrives at the slave node of the packet-based network, and wherein the slave node is configured to perform the timing-recovery process; and
    (c) transmit the packet towards the slave node with the outgoing packet delay value.

12. The packet filter of claim 11, wherein the processor is further configured to:
    (d) receive a reverse measurement packet from the slave node;
    (e) determine whether or not to add an additional delay to the reverse measurement packet;
    (f) add the additional delay to the reverse measurement packet when determination is made to add the additional delay to the reverse measurement packet;

(g) transmit the reverse measurement packet to the master node of the packet-based network;
(h) receive a forward measurement packet from the master node in response to the slave node; and
(i) transmit the forward measurement packet to the slave node.

13. The packet filter of claim 11, wherein the processor is configured to determine whether or not to shift the packet outside of the anchor value window of the timing-recovery process by:
   (a1) receive the packet from the master node in the packet-based network;
   (a2) determine the incoming packet delay value for the packet; and
   (a3) determine whether or not the packet is inside the anchor value window, wherein the processor determines whether or not to shift the packet outside the anchor value window after determination that the packet is inside the anchor value window.

14. The packet filter of claim 11, wherein the processor is configured to determine whether or not to shift the packet outside of the anchor value window of the timing-recovery process by:
   (a1) assign a modulo count value to the packet;
   (a2) compare the assigned modulo count value to a specified threshold value; and
   (a3) determine whether or not to shift the packet outside of the anchor value window based on the comparison of the assigned modulo count value and the specified threshold value.

15. The packet filter of claim 11, wherein the processor is configured to determine whether or not to shift the packet outside of the anchor value window of the timing-recovery process by:
   (a1) assign a random value to the packet;
   (a2) compare the assigned random value to a specified threshold value; and
   (a3) determine whether or not to shift the packet outside of the anchor value window based on the comparison of the assigned random value to the specified threshold value.

16. A packet-based network, comprising:
   a master node;
   a slave node; and
   a packet filter communicatively couplable to the master node and the slave node, the packet filter configured to:
   (a) determine, for a packet in a forward packet flow in the packet-based network, whether or not to shift the packet outside of an anchor value window of a timing-recovery process;
   (b) add a specified non-zero delay offset value to an incoming packet delay value for the packet to generate an outgoing packet delay value for the packet when determination is made to shift the packet outside of the anchor value window, wherein the specified non-zero delay offset value is sufficiently large to ensure the outgoing packet delay value for the packet will be outside of the anchor value window when the packet arrives at the slave node of the packet-based network, and wherein the slave node is configured to perform the timing-recovery process; and
   (c) transmit the packet towards the slave node with the outgoing packet delay value.

17. The packet-based network of claim 16, wherein the packet filter is configured to determine whether or not to shift the packet outside of the anchor value window of the timing-recovery process by:
   (a1) receive the packet from the master node in the packet-based network;
   (a2) determine the incoming packet delay value for the packet; and
   (a3) determine whether or not the packet is inside the anchor value window, wherein the processor determines whether or not to shift the packet outside the anchor value window after determination that the packet is inside the anchor value window.

18. The packet-based network of claim 16, wherein the packet filter is a part of a network emulator that generates the forward packet flow.

19. The packet-based network of claim 16, further comprising:
   an upstream link connecting the packet filter to the master node; and
   a downstream link connecting the packet filter to the slave node, wherein at least one of the upstream link and the downstream link contributes at least a portion of a natural delay distribution to the forward packet flow.

20. The packet-based network of claim 16, wherein the slave node is configured to transmit a current anchor value to the packet filter.

\* \* \* \* \*